(12) United States Patent
Carbone et al.

(10) Patent No.: US 11,590,848 B2
(45) Date of Patent: Feb. 28, 2023

(54) METHOD AND SYSTEM FOR CONTROLLING THE REGENERATIVE BRAKING TORQUE OF A VEHICLE

(71) Applicant: FRENI BREMBO S.P.A., Curno (IT)

(72) Inventors: Fabio Carbone, Curno (IT); Pietro Caresia, Curno (IT); Alessio Miotto, Curno (IT); Giulio Calamai, Curno (IT); Andrea Butti, Curno (IT); Stefano Dossi, Curno (IT)

(73) Assignee: Brembo S.p.A., Bergamo (IT)

( * ) Notice: Subject to any disclaimer, the term of this patent is extended or adjusted under 35 U.S.C. 154(b) by 138 days.

(21) Appl. No.: 16/603,483

(22) PCT Filed: Apr. 6, 2018

(86) PCT No.: PCT/IB2018/052399
§ 371 (c)(1),
(2) Date: Oct. 7, 2019

(87) PCT Pub. No.: WO2018/185720
PCT Pub. Date: Oct. 11, 2018

(65) Prior Publication Data
US 2021/0114464 A1 Apr. 22, 2021

(30) Foreign Application Priority Data
Apr. 7, 2017 (IT) .......................... 102017000038501

(51) Int. Cl.
*B60L 7/26* (2006.01)
*B60L 7/18* (2006.01)
(Continued)

(52) U.S. Cl.
CPC ...... *B60L 7/18* (2013.01); *B60L 7/08* (2013.01); *B60L 7/26* (2013.01); *B60L 50/60* (2019.02);
(Continued)

(58) Field of Classification Search
CPC ............ B60T 1/10; B60T 8/26; B60T 13/586; B60T 2270/604; B60T 2270/608;
(Continued)

(56) References Cited

U.S. PATENT DOCUMENTS 6,378,636 B1 * 4/2002 Worrel ..................... B60L 15/20
180/65.25
6,406,105 B1 * 6/2002 Shimada ................... B60L 7/26
303/152
(Continued)

FOREIGN PATENT DOCUMENTS

DE 102011013592 A1 9/2012
DE 102016004804 A1 * 10/2017 ............ B60T 17/221
(Continued)

OTHER PUBLICATIONS

European Patent Office, International Search Report, dated Jul. 27, 2018, 6 pages, European Patent Office, Rijswijk, Netherlands.

*Primary Examiner* — David A Testardi
(74) *Attorney, Agent, or Firm* — Marshall & Melhorn, LLC (57) ABSTRACT

A method for controlling the regenerative braking torque of a vehicle having a data processing unit for detecting a first information representing a deceleration request of the vehicle, detecting a second information representing a speed of the vehicle, and a first moving member of the vehicle and a second moving member of the vehicle. The method includes determining temperatures of different braking components on different axles, as well as the state of a battery module and a traction and regenerative braking module. The method also includes determining a regenerative braking power dynamic distribution ratio between the first and second axles. A regenerative braking torque is provided to one of the modules.

9 Claims, 5 Drawing Sheets

(51) Int. Cl.
*B60L 7/08* (2006.01)
*B60L 58/12* (2019.01)
*B60L 50/60* (2019.01)
*B60L 58/10* (2019.01)
*B60T 1/10* (2006.01)
*B60W 30/18* (2012.01)

(52) U.S. Cl.
CPC .............. *B60L 58/10* (2019.02); *B60L 58/12* (2019.02); *B60T 1/10* (2013.01); *B60W 30/18127* (2013.01); *B60L 2220/44* (2013.01); *B60L 2240/12* (2013.01); *B60L 2240/36* (2013.01); *B60T 2270/604* (2013.01); *B60T 2270/608* (2013.01)

(58) Field of Classification Search
CPC .......... B60L 7/24; B60L 7/26; B60L 15/2009; B60L 7/18; B60L 2240/36; B60W 30/18127
See application file for complete search history.

(56) References Cited

U.S. PATENT DOCUMENTS

| | | | |
|---|---|---|---|
| 6,907,337 | B2 | 6/2005 | Phillips et al. |
| 9,849,873 | B2 | 12/2017 | Yang et al. |
| 2002/0030408 | A1* | 3/2002 | Niwa ................ B60T 8/267 303/152 |
| 2004/0238244 | A1* | 12/2004 | Amanuma ........... B60W 10/08 180/65.225 |
| 2004/0262994 | A1* | 12/2004 | Baumann ........ B60W 30/18109 303/155 |
| 2006/0055239 | A1* | 3/2006 | Crombez ................. B60L 7/26 303/152 |
| 2007/0029874 | A1* | 2/2007 | Finch ................. B60W 10/184 303/152 |
| 2008/0318728 | A1* | 12/2008 | Soliman ................ B60W 10/26 477/4 |
| 2009/0069149 | A1* | 3/2009 | Okumura ................ B60L 58/20 477/28 |
| 2011/0125351 | A1* | 5/2011 | Bauerle ..................... B60L 7/22 701/22 |
| 2011/0303497 | A1* | 12/2011 | Gaffney ................... B60T 1/10 188/106 P |
| 2012/0160580 | A1* | 6/2012 | Nakata ................ B60W 10/188 180/65.25 |
| 2013/0234675 | A1* | 9/2013 | King ........................ B60L 53/24 320/163 |
| 2014/0025271 | A1* | 1/2014 | Fahland .................... B60L 7/26 701/70 |
| 2014/0203624 | A1* | 7/2014 | Hilton ................... B60T 13/585 303/3 |
| 2015/0094926 | A1* | 4/2015 | O'Meachair ........ B60W 10/188 701/70 |
| 2015/0149055 | A1* | 5/2015 | Newberry ................. B60L 7/26 701/70 |
| 2016/0264111 | A1* | 9/2016 | Doi ........................ B60T 8/1766 |
| 2018/0093571 | A1* | 4/2018 | Hall .......................... B60L 7/18 |

FOREIGN PATENT DOCUMENTS

| | | | | |
|---|---|---|---|---|
| EP | 3100926 A1 | | 12/2016 | |
| JP | 2005014692 A | * | 1/2005 | ............ B60T 17/221 |
| JP | 2005161961 A | | 6/2005 | |
| JP | 2005212707 A | * | 8/2005 | |
| JP | 2007182180 A | * | 7/2007 | |
| JP | 2008148534 A | | 6/2008 | |
| JP | 2008179272 A | | 8/2008 | |
| JP | 2010104087 A | * | 5/2010 | |
| JP | 2016111891 A | | 6/2016 | |
| WO | WO-2017042209 A1 | * | 3/2017 | .......... B60L 15/2009 |
| WO | WO-2019102778 A1 | * | 5/2019 | ................ B60L 7/24 |

\* cited by examiner

METHOD AND SYSTEM FOR CONTROLLING THE REGENERATIVE BRAKING TORQUE OF A VEHICLE

FIELD OF THE INVENTION

The present invention relates to the techniques for controlling traction and regenerative braking in an electric or hybrid vehicle, in particular a method and related system for controlling the regenerative braking torque of a vehicle.

BACKGROUND

Electric or hybrid vehicles are known, provided with a braking system architecture configured to allow the independent control of the traction and regenerative braking torque on the individual axles of the vehicle, on which one or more wheels typically are mounted.

Additionally, electric or hybrid vehicles are equipped with an electrical energy battery which is the reserve of electrical energy that can be used by the architecture of the braking system to perform the function of traction and regenerative braking torque on the individual axles.

It is known to control the braking power in the aforesaid electric or hybrid vehicles by performing a fixed distribution of the regeneration electric power available in the battery between the axles of the vehicle according to a physical law which describes the dynamic of the vehicle according to information representing the vehicle itself and/or of its use.

Such information typically is the request for deceleration or braking by the driver or the automatic guide system (if present), the mass of the vehicle, the distribution of the weight of the vehicle with respect to the position of the center thereof, the rolling radius of each wheel of the vehicle.

The fixed distribution of the regeneration electric power between the axles of the vehicle has the drawback of providing a distribution of electric power on an axle also if it might not be required, resulting in the application of a force not required with an according excessive tightening for example, between the caliper and the disc brake adapted to brake the wheel mounted on that specific axle.

Such an inefficiency occurs even more frequently in the case of a vehicle (e.g. a sports event vehicle) in which there is certainly an intensive intervention of the braking system (repeated acceleration and braking).

In any case, the excessive fatigue to which the braking system is subjected on the one hand does not allow reliability to be ensured in terms of maximum performance and on the other hand, results in an increase of the wear and a drastic decrease of the operating life of the components of the braking system itself.

SUMMARY

It is the object of the present invention to devise and make available a method for controlling the regenerative braking torque of a vehicle which allows at least partly obviating the drawbacks indicated above with reference to the known art, and in particular which ensures as constant an efficiency of the braking system as possible, such as to avoid excessive conditions of fatigue while ensuring maximum performance, reducing the wear and increasing the operating life of the components of the braking system.

Such an object is achieved by a method for controlling the regenerative braking torque of a vehicle, the vehicle comprising at least one first axle on which, at least one first moving member of the vehicle is mounted and at least one second axle on which at least one second moving member of the vehicle is mounted, the vehicle further comprising a braking system comprising a first plurality of components operatively associated with said at least one first axle and a second plurality of components operatively associated with said at least one second axle, the vehicle comprising at least one traction and regenerative braking supply module configured to provide the regenerative braking torque to one or more regenerative braking torque actuation modules with which the vehicle is provided, the vehicle further comprising a battery module and at least one data processing unit operatively connected to said at least one traction and regenerative braking supply module, to the first plurality of components of the braking system, to the second plurality of components of the braking system, the method comprising steps of:

detecting, by the at least one data processing unit, a first information representing a deceleration request of the vehicle;

detecting, by the at least one data processing unit, a second information representing a speed of at least one of the vehicle, the first moving member of the vehicle and the second moving member of the vehicle;

determining, by the at least one data processing unit, a first temperature value of at least one component of the first plurality of components of the braking system operatively associated with said at least one first axle;

determining, by the at least one data processing unit, a second temperature value of at least one component of the second plurality of components of the braking system operatively associated with said at least one second axle;

determining, by the at least one data processing unit, a third information representing the state of at least one of the battery module and said at least one traction and regenerative braking supply module;

determining, by the at least one data processing unit, a regenerative braking power dynamic distribution ratio between the first axle and the second axle on the basis of the first information, of the first temperature value and of the second temperature value;

determining, by the at least one data processing unit, a first regenerative braking torque value to be applied to the first axle and a second regenerative braking torque value to be applied to the second axle on the basis of the determined regenerative braking power dynamic distribution ratio, of the second information and of the third information;

providing, by the at least one data processing unit, the first regenerative braking torque value and the second regenerative braking torque value to said at least one traction and regenerative braking supply module.

The object of the present invention is also a system for controlling the regenerative braking torque of a vehicle, comprising:

at least one first axle on which at least one first moving member of the vehicle is mounted and at least one second axle on which at least one second moving member of the vehicle is mounted;

a braking system comprising a first plurality of components operatively associated with said at least one first axle and a second plurality of components operatively associated with said at least one second axle;

at least one traction and regenerative braking supply module configured to provide the regenerative braking torque to one or more regenerative braking torque actuation modules with which the vehicle is provided;

a battery module;

at least one data processing unit operatively connected to said at least one traction and regenerative braking supply module, to the first plurality of components of the braking system, to the second plurality of components of the braking system, the at least one data processing unit being configured to perform the steps of: detecting a first information representing a deceleration request of the vehicle; detecting a second information representing a speed of at least one of the vehicle, the first moving member of the vehicle and the second moving member of the vehicle;

determining a first temperature value of at least one component of the first plurality of components of the braking system operatively associated with said at least one first axle;

determining a second temperature value of at least one component of the second plurality of components of the braking system operatively associated with said at least one second axle;

determining a third information representing the state of at least one of the battery module and said at least one traction and regenerative braking supply module;

determining a regenerative braking power dynamic distribution ratio between the first axle and the second axle on the basis of the first information, of the first temperature value and of the second temperature value;

determining a first regenerative braking torque value to be applied to the first axle and a second regenerative braking torque value to be applied to the second axle on the basis of the determined regenerative braking power dynamic distribution ratio, of the second information and of the third information;

providing the first regenerative braking torque value and the second regenerative braking torque value to said at least one traction and regenerative braking supply module.

BRIEF DESCRIPTION OF THE FIGURES

Further features and advantages of the method and related system according to the invention will become apparent from the following description of preferred embodiments thereof, given only by way of non-limiting, indicative example, with reference to the accompanying drawings, in which.

DETAILED DESCRIPTION

A system for controlling the regenerative braking torque of a vehicle according to various embodiments of the present invention is now described.

The system for controlling the regenerative braking torque of a vehicle is indicated hereinafter in the present invention also only as control system or simply system.

It is worth noting that equal or similar elements in the figures are indicated with the same numbers.

It is worth noting that for the purposes of the present description, the system may be intended as the vehicle itself for which controlling the regenerative braking torque is executed.

Reference to system or vehicle indeed is made below without distinction.

The vehicle, indicated as a whole with reference numeral 100, is for example, a four-wheel vehicle.

However, such a vehicle could also be a two- or three-wheel motor vehicle or a vehicle with more than four wheels.

Figure 1:
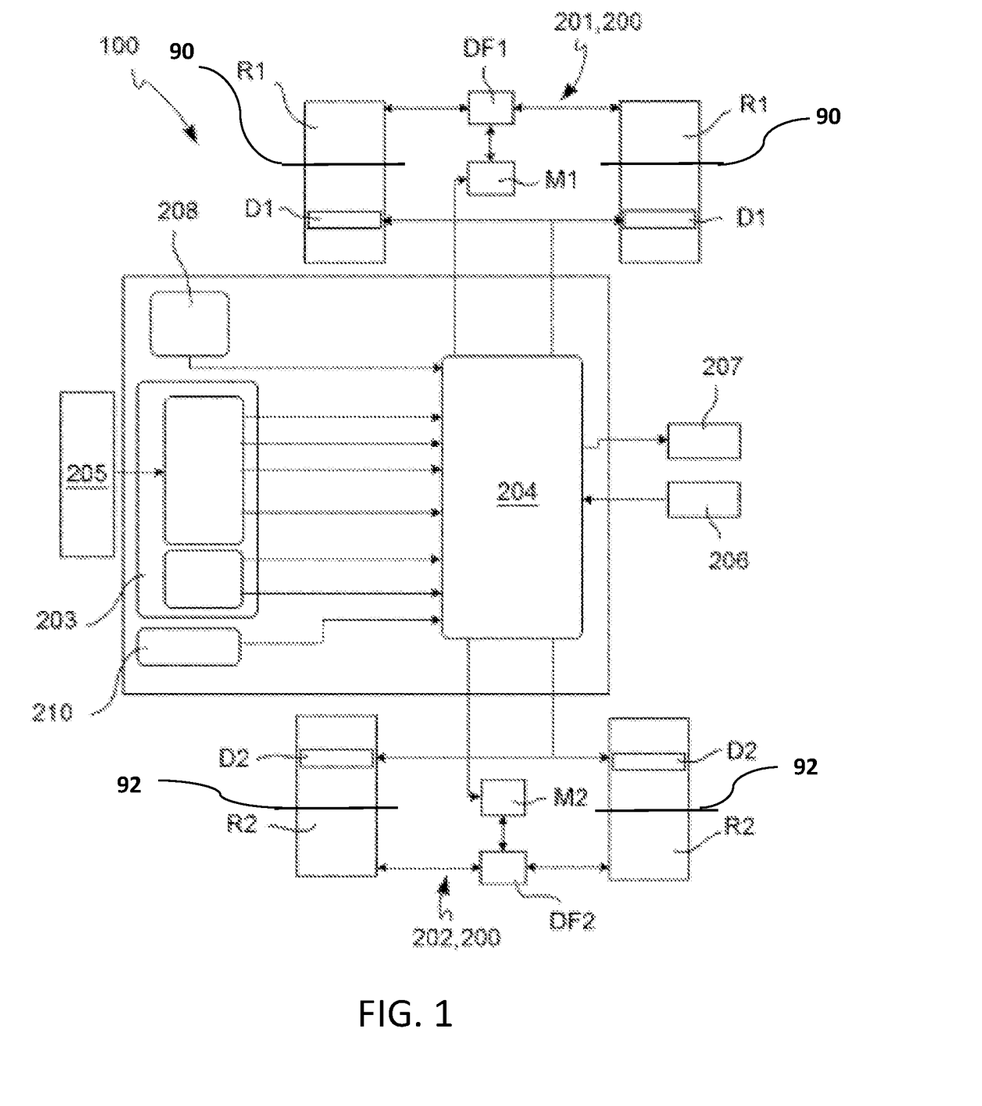
FIG. 1 shows by means of a block diagram a system for controlling the regenerative braking torque of a vehicle in one embodiment of the invention.
Figure 2:
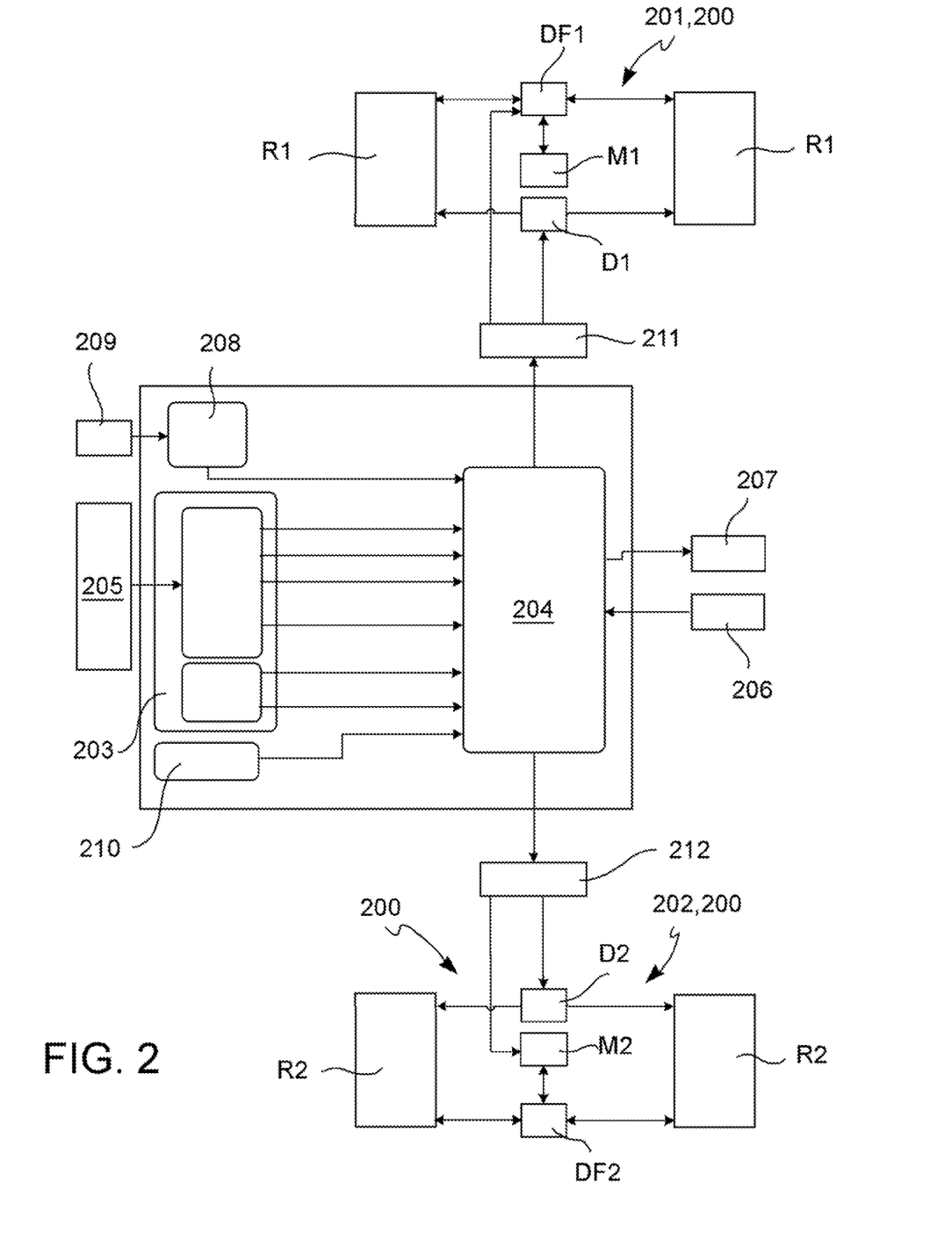
FIG. 2 shows by means of a block diagram a system for controlling the regenerative braking torque of a vehicle according to a further embodiment of the invention.

With reference to the embodiments of the FIGS. 1 and 2, the vehicle 100 comprises at least one first axle on which at least one first moving member R1 of the vehicle 100 is mounted.

In the example of the FIGS. 1 and 2, the at least one first axle is the front axle 90 of the vehicle 100 and the first moving member R1 of the vehicle 100 is the front right wheel or the front left wheel, both indicated with the reference numeral R1.

The vehicle 100 further comprises at least one second axle on which at least one second moving member R1 of the vehicle 100 is mounted.

In the example of the FIGS. 1 and 2, the at least one second axle is the rear axle 92 of the vehicle 100 and the second moving member R2 of the vehicle 100 is the rear right wheel or the rear left wheel, both indicated with the reference numeral R2.

With reference to the embodiments of the FIGS. 1 and 2, the vehicle 100 further comprises a braking system 200.

The braking system 200 comprises a first plurality of components 201 operatively associated with said at least one first axle on which said at least one first moving member R1 of the vehicle 100 is mounted.

Moreover, the braking system 200 comprises a second plurality of components 202 operatively associated with said at least one second axle on which said at least one second moving member R2 of the vehicle 100 is mounted.

In greater detail, the first plurality of components 201 of the braking system 200 comprises a first brake disc with which the at least one first moving member R1 is provided (e.g. the front right wheel) mounted on the first axle and a first brake caliper operable to exert a dissipative braking torque on the first brake disc.

It is worth noting that for the purposes of the present description, the first plurality of components 201 of the braking system 200 further comprises also a brake fluid circulating in the braking system 200.

In the example of the FIGS. 1 and 2, the first plurality of components 201 of the braking system 200 further comprises a further first brake disc with which a further first moving member R1 is provided (e.g. the front left wheel) mounted on the at least one first axle and a further first brake caliper operable to exert a dissipative braking torque also on the further first brake disc.

Similarly, the second plurality of components 202 of the braking system 200 comprises a second brake disc with which the at least one second moving member R2 is provided (e.g. the rear right wheel) mounted on the second axle and a second brake caliper operable to exert a dissipative braking torque on the second brake disc.

It is worth noting that for the purposes of the present description, the second plurality of components 202 of the braking system 200 also comprises the brake fluid circulating in the braking system 200.

In the example of the FIGS. 1 and 2, the second plurality of components 202 of the braking system 200 further comprises a further second brake disc with which a further second moving member R2 is provided (e.g. the rear left wheel) mounted on the at least one second axle and a further second brake caliper operable to exert a dissipative braking torque also on the further second brake disc.

Referring again to the FIGS. 1 and 2, the first plurality of components 201 of the braking system 200 further comprises a first dissipative braking torque actuation device D1.

The first dissipative braking torque actuation device D1 (for example, an electromechanical or electro-hydraulic actuator) is configured to exert the dissipative braking torque (Brake by Wire type, BbW) on the first brake disc, mounted on the first moving member R1 of the vehicle 100, by means of the first brake caliper.

Similarly, the second plurality of components 202 of the braking system 200 further comprises a second dissipative braking torque actuation device D2.

The second dissipative braking torque actuation device D2 (for example, an electromechanical or electro-hydraulic actuator) is configured to exert the dissipative braking torque (Brake by Wire type, BbW) on the second brake disc, mounted on the second moving member R2 of the vehicle 100, by means of the second brake caliper.

According to one embodiment shown in the FIG. 1, the first plurality of components 201 further comprises a further first dissipative braking torque actuation device, indicated again with the reference D1.

The further first dissipative braking torque actuation device D1 (for example, an electromechanical or electro-hydraulic actuator again) is configured to exert the dissipative braking torque (Brake by Wire type, BbW) on the further first brake disc, mounted on the further first moving member R1 of the vehicle 100, by means of the further first brake caliper.

In this embodiment (FIG. 1), the second plurality of components 202 further comprises a further second dissipative braking torque actuation device, indicated again with the reference D2.

The further second dissipative braking torque actuation device D2 (for example, an electromechanical or electro-hydraulic actuator again) is configured to exert the dissipative braking torque (Brake by Wire type, BbW) on the further second brake disc, mounted on the further second moving member R2 of the vehicle 100, by means of the further second brake caliper.

It is worth noting that the embodiment of the FIG. 1 shows a braking system 200 with dissipative braking torque actuation devices of the Brake by Wire type (BbW) distributed on each moving member (wheel) of the vehicle 100.

According to a further embodiment shown in the FIG. 2, alternative to the preceding one, the first plurality of components 201 of the braking system 200 only comprises a first dissipative braking torque actuation device D1 operatively associated with the first axle.

The first dissipative braking torque actuation device D1 (for example, an electromechanical or electro-hydraulic actuator) is configured to exert the dissipative braking torque (Brake by Wire type, BbW) on the first brake disc, mounted on the first moving member R1 of the vehicle 100, by means of the first brake caliper.

Moreover, the first dissipative braking torque actuation device D1 is configured to exert the dissipative braking torque (Brake by Wire type, BbW) on the further first brake disc, mounted on the further first moving member R1 of the vehicle 100, by means of the further first brake caliper.

In this further embodiment (FIG. 2), the second plurality of components 202 of the braking system 200 only comprises a second dissipative braking torque actuation device D2 operatively associated with the first axle.

The second dissipative braking torque actuation device D2 (for example, an electromechanical or electro-hydraulic actuator) is configured to exert the dissipative braking torque (Brake by Wire type, BbW) on the second brake disc, mounted on the second moving member R2 of the vehicle 100, by means of the first brake caliper.

Moreover, the second dissipative braking torque actuation device D2 is configured to exert the dissipative braking torque (Brake by Wire type, BbW) on the further second brake disc, mounted on the further second moving member R2 of the vehicle 100, by means of the further second brake caliper.

It is worth noting that the embodiment of the FIG. 2 shows a braking system 200 with dissipative braking torque actuation devices D1, D2 of the Brake by Wire type (BbW) distributed on each axle of the vehicle 100.

According to a further embodiment (not shown in the figures), the first dissipative braking torque actuation device D1 of the first plurality of components 201 of the braking system 200 coincides with the second dissipative braking torque actuation device D2 of the second plurality of components 202 of the braking system 200.

In other words, the first plurality of components 201 of the braking system 200 and the second plurality of components 202 of the braking system 200 comprise the first dissipative braking torque actuation device D1 acting as centralized dissipative braking torque actuation device (Brake by Wire type, BbW).

In greater detail, the first dissipative braking torque actuation device (for example, an actuator of electromechanical or electro-hydraulic type) is configured to exert the dissipative braking torque:

on the first brake disc, mounted on the first moving member R1 of the vehicle 100 (front right wheel), by means of the first brake caliper;

on the further first brake disc, mounted on the further first moving member R1 of the vehicle 100 (front left wheel), by means of the further first brake caliper;

on the second brake disc, mounted on the second moving member R2 of the vehicle 100 (rear right wheel), by means of the second brake caliper;

on the further second brake disc, mounted on the further second moving member R2 of the vehicle 100 (rear left wheel), by means of the further second brake caliper.

Returning in general to the embodiments of the FIGS. 1 and 2, the vehicle 100 further comprises at least one traction and regenerative braking supply module 203 configured to provide the regenerative braking torque to one or more regenerative braking torque actuation modules (described below) with which the vehicle 100 is provided.

Moreover, the vehicle 100 comprises at least one data processing unit 204 operatively connected to said at least one traction and regenerative braking supply module 203, to the first plurality of components 201 of the braking system 200, to the second plurality of components 202 of the braking system 200.

The at least one traction and regenerative braking supply module 203 is configured to receive, from said at least one data processing unit 204, one or more requests for regenerative braking torque to be provided to respective regenerative braking torque actuation modules with which the braking system 200 may be provided.

In this regard, according to one embodiment (shown in the FIGS. 1 and 2), the first plurality of components 201 of the braking system 200 comprises a first regenerative braking torque actuation module M1 operatively connected to the at least one first axle on which the at least one first moving member R1 is mounted.

According to this embodiment, the second plurality of components 202 of the braking system 200 comprises at least one second regenerative braking torque actuation module M2 operatively connected to the at least one second axle on which the at least one second moving member R2 is mounted.

In greater detail, the first plurality of components 201 of the braking system 200 comprises a first differential module DF1 operatively connected to the at least one first axle, if, as shown in the FIG. 1, two or more moving members (wheels) of the vehicle are mounted to the at least one first axle.

The first regenerative braking torque actuation module M1 is configured to transfer the regenerative braking torque requested by the at least one data processing unit 204 to the first moving member R1 (front right wheel) of the vehicle 100 and the further first moving member R1 (front left wheel) of the vehicle 100 by means of the first differential module DF1.

It is worth noting that the first regenerative braking torque actuation module M1 is for example, an electric motor, while the first differential module DF1 is for example, a differential device, both mounted on the at least one first axle.

In this embodiment (FIG. 1), the second plurality of components 202 of the braking system 200 comprises a second differential module DF2 operatively connected to the at least one second axle, if, as shown in the FIG. 1, two or more moving members (wheels) of the vehicle are mounted to the at least one second axle.

The second regenerative braking torque actuation module M2 is configured to transfer the regenerative braking torque requested by the at least one data processing unit 204 to the second moving member R2 (rear right wheel) of the vehicle 100 and the further second moving member R2 (rear left wheel) of the vehicle 100 by means of the second differential module DF2.

It is worth noting that the second regenerative braking torque actuation module M2 is for example, an electric motor, while the second differential module DF2 is a differential device, both mounted on the at least one first axle.

It is worth noting that in the configuration of the embodiments of the FIGS. 1 and 2, the first plurality of components 201 of the braking system 200 and the second plurality of components 202 of the braking system 200 comprise regenerative braking torque actuation modules each distributed on one axle of the vehicle.

According to further embodiments (not shown in the figures), the first regenerative braking torque actuation module M1 is mounted on the first moving member R1 (front right wheel) of the vehicle 100 (In Wheel Motor type configuration) or on a first axle shaft (e.g. the front right one) on which the first moving member R1 (front right wheel) of the vehicle 100 is mounted (In Hub Motor configuration).

In these embodiments, the first plurality of components 201 of the braking system 200 further comprises a further first regenerative braking torque actuation module M1, which may be mounted on the further first moving member R1 of the vehicle 100 (In Wheel Motor type configuration) or on a further first axle shaft (e.g. the front left one) on which the further first moving member R1 of the vehicle 100 is mounted (In Hub Motor configuration).

Moreover, again in these embodiments, the second regenerative braking torque actuation module M2 is mounted on the second moving member R2 (rear right wheel) of the vehicle 100 (In Wheel Motor type configuration) or on a second axle shaft (e.g. the rear right one) on which the second moving member R1 (rear right wheel) of the vehicle 100 is mounted (In Hub Motor configuration).

In these embodiments, the second plurality of components 202 of the braking system 200 further comprises a further second regenerative braking torque actuation module M2, which may be mounted on the further second moving member R2 of the vehicle 100 (In Wheel Motor type configuration) or on a further second axle shaft (e.g. the rear left one) on which the further second moving member R2 of the vehicle 100 is mounted (In Hub Motor configuration).

It is worth noting that, according to the embodiments just described, the first plurality of components 201 of the braking system 200 and the second plurality of components 202 of the braking system 200 comprise regenerative braking torque actuation modules each distributed directly on a respective moving member (wheel) of the vehicle 100 (In Wheel Motor configuration) or directly on a respective axle shaft of the vehicle 100 (In Hub Motor configuration).

According to a further embodiment (not shown in the figures) alternative to the preceding one, the first regenerative braking torque actuation module M1 of the first plurality of components 201 (e.g. an electric motor) of the braking system 200 coincides with the second regenerative braking torque actuation module M2 (e.g. electric motor) of the second plurality of components 202 of the braking system 200.

In this embodiment, the first plurality of components 201 of the braking system 200 comprises a first differential module DF1 (e.g. a differential device) operatively connected to the at least one first axle, if two or more moving members (wheels) of the vehicle are mounted to the at least one first axle.

In this embodiment, the second plurality of components 202 of the braking system 200 comprises a second differential module DF2 (e.g. a differential device) operatively connected to the at least one second axle, if two or more moving members (wheels) of the vehicle are mounted to the at least one first axle.

In this embodiment, the first regenerative braking torque actuation module M1 is configured to transfer the regenerative braking torque requested by the at least one data processing unit 204 to the first moving member R1 (front right wheel) of the vehicle 100 and the further first moving member R1 (front left wheel) of the vehicle 100 by means of the first differential module DF1.

Moreover, the first regenerative braking torque actuation module M1 is configured to transfer the regenerative braking torque requested by the at least one data processing unit 204 to the second moving member R2 (rear right wheel) of the vehicle 100 and the further second moving member R2 (rear left wheel) of the vehicle 100 by means of the second differential module DF2.

In other words, in this embodiment, the regenerative braking torque actuation module (electric motor) is centralized.

It is worth noting that in a further embodiment (not shown in the figures), the braking system 200 may further comprise an internal combustion engine ICE configured to provide the dissipative (mechanical) braking torque to the first moving member R1 and the further first moving member R1 (if present) of the vehicle 100 and to the second moving member R2 and the further second moving member R2 (if present) of the vehicle 100.

In particular, in this embodiment, both the centralized regenerative braking torque actuation module and the internal combustion engine provide the respective braking torque (regenerative or dissipative) to a control unit of braking torque of the axles which, on the basis of controls received from the at least one data processing unit 204, is configured to provide the braking torque (regenerative or dissipative) to the first moving member R1 and the further first moving member R1 (if present) of the vehicle 100 by means of a first electromechanical or electro-hydraulic device adapted to transfer the braking torque (regenerative or dissipative) to the first differential module DF1 and to the second moving member R2 and the further second moving member R2 (if present) of the vehicle 100 by means of a second electromechanical or electro-hydraulic device adapted to transfer the braking torque (regenerative or dissipative) to the second differential module DF2 (if present).

Returning in general to the embodiments of the FIGS. 1 and 2, the vehicle 100 further comprises a battery module 205 operatively connected to the at least one traction and regenerative braking supply module 203.

It is worth noting that the battery module 205 comprises an electric battery and a control unit operatively connected to the electric battery and configured to manage the electric battery. The electric battery and the respective control unit are not shown in the figures.

According to other embodiments (not shown in the figures), the battery module 205 may comprise further electrical energy storage modules operatively connected to the control unit of the battery module 205.

With general reference to the embodiments of the FIGS. 1 and 2, the vehicle 100 further comprises a module 206 for the deceleration request of the vehicle 100, operatively connected to the at least one data processing unit 204.

The module 206 for the deceleration request of the vehicle 100 is configured to provide to the at least one data processing unit 204 a deceleration request of vehicle 100.

In one embodiment, the module 206 for the deceleration request of the vehicle 100 is an electric and/or mechanical device operable by a driver of the vehicle 100 (for example the brake pedal and/or the accelerator pedal) to manually provide the deceleration request of the vehicle 100.

According to a further embodiment alternative to the preceding one, the module 206 for the deceleration request of the vehicle 100 is an electronic unit forming part of an electronic automatic drive system of the vehicle 100 configured to automatically provide to the at least one data processing unit 204 the deceleration request of the vehicle 100.

Referring again to the embodiments of the FIGS. 1 and 2, the vehicle 100 further comprises a dissipation resistance module 207 operatively connected to the at least one data processing unit 204.

The dissipation resistance module 207 is configured to dissipate a quantity of regenerative power which is not allocated inside the battery module 205.

Again according to the embodiments of the FIGS. 1 and 2, the vehicle 100 further comprises a speed detection module 208 of at least one of the vehicle 100, the first moving member R1 of the vehicle 100 and the second moving member R2 of the vehicle 100.

The speed detection module 208 is operatively connected to the at least one data processing unit 204.

In one embodiment shown in the FIG. 2, the vehicle 100 further comprises a plurality of sensors 209 distributed on the vehicle 100, for example on the chassis of the vehicle 100, operatively connected to the speed detection module 208.

The plurality of sensors 209 is configured to provide the speed detection module 208 with information representing the dynamics of the vehicle 100 on the basis of which to determine the speed of the vehicle 100 or of the first moving member R1 of the vehicle 100 or of the second moving member R2 of the vehicle.

It is worth noting that the plurality of sensors 209 may be provided also in combination with the embodiment of the FIG. 1, even though it is not specifically illustrated.

Returning now to a more general embodiment of the present invention, again illustrated in the FIGS. 1 and 2, the vehicle 100 further comprises a module 210 for estimating parameters of the braking system 200, operatively connected to the at least one data processing unit 204.

Examples of such parameters are wear and temperature.

Again with general reference to the embodiments illustrated in the FIGS. 1 and 2, the at least one data processing unit 204 is configured to execute a method for controlling the regenerative braking torque of a vehicle, which is described later.

In greater detail, with reference to the embodiment of the FIG. 1, the at least one data processing unit 204 is one alone, therefore it is a central data processing unit.

According to a further embodiment shown in the FIG. 2, the vehicle 100 further comprises a first secondary data processing unit 211 operatively connected to the at least one first axle on which said at least one first moving member R1 of the vehicle 100 is mounted, and a second secondary data processing unit 212 operatively connected to the at least one second axle on which said at least one second moving member R2 of the vehicle is mounted.

In greater detail, the first secondary data processing unit 211 is operatively interposed between the at least one data processing unit 204 and the at least one first axle.

The at least one data processing unit 204 is configured to provide controls to the first secondary data processing unit 211 which in turn accordingly controls the first plurality of components 201 of the braking system 200 operatively associated with the first axle.

Similarly, the second secondary data processing unit 212 is operatively interposed between the at least one data processing unit 204 and the at least one second axle.

The at least one data processing unit 204 is configured to provide controls to the second secondary data processing unit 212 which in turn accordingly controls the second plurality of components 202 of the braking system 200 operatively associated with the second axle.

In the embodiment of the FIG. 2, the at least one data processing unit 204 is a central data processing unit.

According to a further embodiment alternative to the preceding ones and not shown in the drawings, the at least one data processing unit 204 comprises a first data processing unit operatively connected to said at least one first axle on which the at least one first moving member R1 of the vehicle 100 is mounted.

Moreover, the at least one data processing unit 204 comprises a second data processing unit operatively connected to said at least one second axle on which the at least one second moving member R2 of the vehicle 100 is mounted.

Both the first data processing unit and the second data processing unit comprised in the at least one data processing unit 204 are operatively connected to the at least one traction and regenerative braking supply module 203, the dissipation resistance module 207, the module 206 for the deceleration request of the vehicle 100, the speed detection module 208, the module 210 for estimating parameters of the braking system 200.

The first data processing unit comprised in the at least one data processing unit 204 is configured to execute the method for controlling regenerative braking torque, like the one executed by the at least one data processing unit 204, relative to the first axle alone on which said at least one first moving member R1 of vehicle 100 is mounted.

The second data processing unit comprised in the at least one data processing unit 204 instead is configured to method for controlling regenerative braking torque, like the one executed by the at least one data processing unit 204, relative to the second axle alone on which said at least one second moving member R2 of vehicle 100 is mounted.

Referring now also to the FIG. 3, a method 300 for controlling the regenerative braking torque of a vehicle 100 (hereinafter also control method or simply method) is now described.

As already mentioned above, with reference to the FIGS. 1 and 2 and other embodiments, such a vehicle 100 comprises at least one first axle on which at least one first moving member R1 of the vehicle 100 is mounted and at least one second axle on which at least one second moving member R2 of the vehicle 100 is mounted.

The vehicle 100 further comprises a braking system 200 comprising a first plurality of components 201 operatively associated with said at least one first axle and a second plurality of components 202 operatively associated with said at least one second axle.

The vehicle 100 comprises at least one traction and regenerative braking supply module 203 configured to provide the regenerative braking torque to one or more regenerative braking torque actuation modules with which the vehicle 100 is provided.

The vehicle 100 further comprises a battery module 205 and at least one data processing unit 204 operatively connected to said at least one traction and regenerative braking supply module 203, to the first plurality of components 201 of the braking system 200, to the second plurality of components 202 of the braking system 200.

Figure 3:
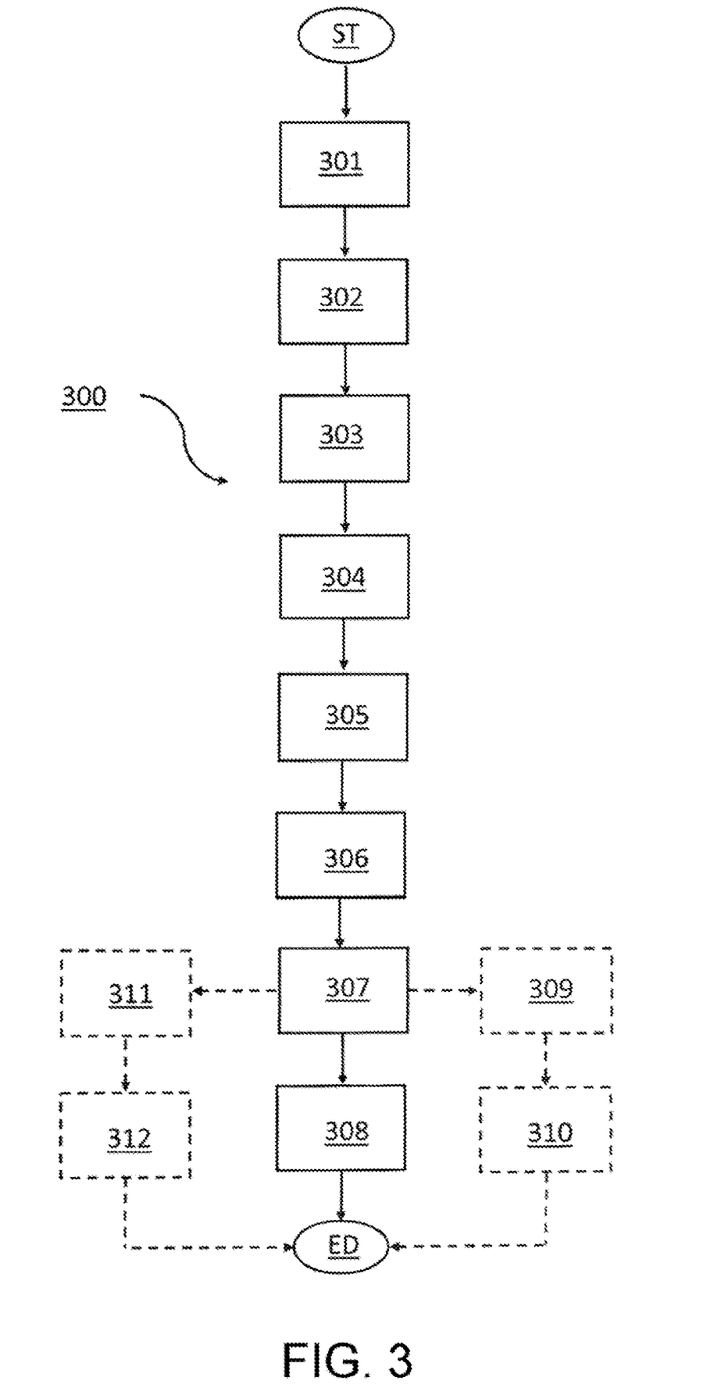
FIG. 3 shows by means of a block diagram a method for controlling the traction and braking torque of a vehicle according to a further embodiment of the invention.

With reference to the FIG. 3, the method 300 comprises a symbolic step of starting ST.

The method 300 further comprises a step of detecting 301, by the at least one data processing unit 204, a first information representing a deceleration request of the vehicle 100.

According to one embodiment, the first information representing a deceleration request of the vehicle 100 may be manually provided by the driver of the vehicle 100, through the module 206 for the deceleration request of the vehicle 100, such as an electric and/or mechanical device operable by the driver of the vehicle 100, for example the brake pedal and/or the accelerator pedal.

According to a further embodiment, alternative to the preceding one, the first information representing a deceleration request of the vehicle 100 may be automatically provided by the module 206 for the deceleration request of the vehicle 100, such as an electronic unit belonging to an electronic automatic drive system of the vehicle 100.

Returning to the FIG. 3, the method 300 further comprises a step of detecting 302, by the at least one data processing unit 204, a second information representing a speed of at least one of the vehicle 100, the first moving member R1 of the vehicle and the second moving member R2 of vehicle 100.

It is worth noting that such second information is provided by the speed detection module 208 with which the vehicle 100 is provided.

The method 300 further comprises a step of determining 303, by the data processing unit 204, a first temperature value of at least one component of the first plurality of components 201 of the braking system 200 operatively associated with said at least one first axle.

The first plurality of components 201 of the braking system 200 comprises the first brake disc, the first brake caliper, the brake fluid.

In one embodiment, the step of determining 303 the first temperature value is performed by using a plurality of sensors distributed on the first plurality of components 201 of the braking system 200, operatively connected to the at least one data processing unit 204.

In a further embodiment, the step of determining 303 the first temperature value comprises a step of estimating, by the at least one data processing unit 204, the first temperature value.

In greater detail, the step of estimating the first temperature value is obtained on the basis of the measurement of the force exerted by a component of the first plurality of components 201 of the braking system 200 (for example, the force exerted by the first brake caliper and/or the pressure of the brake fluid) and on the basis of the second information representing the speed of at least one of the vehicle 100, the first moving member R1 of the vehicle 100, the second moving member R2 of the vehicle 100.

Returning to the FIG. 3, the method 300 further comprises a step of determining 304, by the at least one data processing unit 204, a second temperature value of at least one component of the second plurality of components 202 of the braking system 200 operatively associated with said at least one second axle.

The second plurality of components 202 of the braking system 200 comprises the second brake disc, the second brake caliper, the brake fluid.

In one embodiment, the step of determining 304 the second temperature value is performed by using a plurality of sensors distributed on the second plurality of components 202 of the braking system 200, operatively connected to the at least one data processing unit 204.

In a further embodiment, the step of determining 304 the second temperature value comprises a step of estimating, by the at least one data processing unit 204, the second temperature value.

In greater detail, the step of estimating the second temperature value is obtained on the basis of the measurement of the force exerted by a component of the second plurality of components 202 of the braking system 200 (for example, the force exerted by the second brake caliper and/or the pressure of the brake fluid) and on the basis of the second information representing the speed of at least one of the vehicle 100, the first moving member R1 of the vehicle 100, the second moving member R2 of the vehicle 100.

Returning to the FIG. 3, the method 300 further comprises a step of determining 305, by the at least one data processing unit 204, a third information representing the state of at least one of the battery module 205 and said at least one traction and regenerative braking supply module 203.

It is worth noting that "state" of at least one of the battery module 205 and said at least one traction and regenerative braking supply module 203 is meant the electric charge state of the battery module 205, the torque delivered by the electric motors, the electric power dispensed/absorbed by the battery module 205 and by any electrical storage systems, the maximum regeneration (or regenerative) power allowed by the battery module 205 and by any electrical storage systems, the maximum electric power allowed by the possible dissipative resistance system, etc.

With reference again to the FIG. 3, the method 300 further comprises a step of determining 306, by the at least one data processing unit 204, a regenerative braking power dynamic distribution ratio between the first axle and the second axle on the basis of the first information, of the first temperature value and of the second temperature value.

The determination of such a regenerative braking power dynamic distribution ratio is described later according to one embodiment.

Referring again to the FIG. 3, the method 300 further comprises a step of determining 307, by the data processing unit 204, a first regenerative braking torque value to be applied to the first axle and a second regenerative braking torque value to be applied to the second axle on the basis of the determined regenerative braking power dynamic distribution ratio, of the second information and of the third information.

The method 300 further comprises a step of providing 308, by the at least one data processing unit 204, the first regenerative braking torque value and the second regenerative braking torque value to said at least one traction and regenerative braking supply module 203.

The method 300 therefore comprises a symbolic step of ending ED.

According to one embodiment shown in the FIGS. 1 and 2, it is reiterated that the first plurality of components 201 of the braking system 200 associated with said at least one first axle comprises at least one first dissipative braking torque actuation device D1.

Moreover, the second plurality of components 202 of the braking system 200 associated with said at least one second axle further comprises a second dissipative braking torque actuation device D2.

In this embodiment, which is depicted with dotted lines in the FIG. 3, in combination with the preceding one described with reference to FIG. 3, the method 300 further comprises a step of determining 309, by the at least one data processing unit 204, a first dissipative braking torque value to be applied to the first axle and a second dissipative braking torque value to be applied to the second axle on the basis of the determined regenerative braking power dynamic distribution ratio, of the first information and of the third information.

Moreover, the method 300 comprises a step of providing 310, by the at least one data processing unit 204, the first dissipative braking torque value to said first dissipative braking torque actuation device D1 and the second dissipative braking torque value to said at least one second dissipative braking torque actuation device D2.

According to a further embodiment shown in the FIGS. 1 and 2, in combination with any one of the ones described above, the vehicle 100 further comprises a dissipation resistance module 207.

In this embodiment, which is shown with dotted lines in the FIG. 3, the method 300 comprises a step of determining 311, by the at least one data processing unit 204, a dissipative electric power value on the basis of the third information, of the first dissipative braking torque value and of the second dissipative braking torque value.

The method 300 further comprises a step of providing 312, by the at least one data processing unit 204, the dissipative electric power value to the dissipation resistance module 207.

In greater detail now of the method 300, according to one embodiment thereof (not shown in the drawings), the step of determining 306 the regenerative braking power dynamic distribution ratio between the first axle and the second axle comprises a step of determining, by the at least one data processing unit 204, a braking power fixed distribution ratio RPF between the first axle and the second axle on the basis of the first information representing the deceleration request of the vehicle 100 and of data representing properties of the vehicle 100.

Examples of data representing properties of the vehicle are the deceleration request of the vehicle 100, the mass of the vehicle 100, the distribution of the weights of the vehicle 100 with respect to the position of the center of vehicle 100, the rolling radius of the wheel.

The braking power fixed distribution ratio RPF is the ratio between the front braking power (or torque or force) of the vehicle (first axle) and the rear braking power (or torque or force) of the vehicle (second axle) which may be determined by means of a function or physical law that describes the dynamic of the vehicle.

The fixed distribution ratio RPF is a function of the deceleration request of the vehicle RDV and of the data representing properties of the vehicle DPV:

$$RPF = f(RDV, DPV)$$

It is worth noting that a calculation example of the braking power fixed distribution ratio RPF is described later in a related APPENDIX 1, with the aid of the FIG. 4.

Returning to the method of the FIG. 3, the step of determining 306 the regenerative braking power dynamic distribution ratio between the first axle and the second axle further comprises a step of determining, by the at least one data processing unit 204, a regenerative braking power variation of the first axle on the basis of the first temperature value and a set first temperature threshold value.

In other words, the regenerative braking power variation of the first axle VPF1 is a function of the first temperature value T1 and of a set first temperature threshold value ST1:

$$VPF1 = f(T1, ST1)$$

The step of determining 306 the regenerative braking power dynamic distribution ratio between the first axle and the second axle further comprises a step of determining, by the at least one data processing unit 204, a regenerative braking power variation of the second axle on the basis of the second temperature value and a set second temperature threshold value.

In other words, the regenerative braking power variation of the second axle VPF2 is a function of the first temperature value T2 and of a set second threshold temperature value ST2:

$$VPF2 = f(T2, ST2)$$

It is worth noting that the regenerative braking power dynamic distribution ratio between the first axle and the second axle is determined, by the at least one data processing unit 204, as a function of the braking power fixed distribution ratio between the first axle and the second axle, of the regenerative braking power variation of the first axle and of the regenerative braking power variation of the second axle.

Indeed, the regenerative braking power dynamic distribution ratio RDPF is a function of the fixed distribution ratio RPF, of the regenerative braking power variation of the first axle VPF1 and of the regenerative braking power variation of the second axle VPF2:

$$RDPF=f(RPF,VPF1,VPF2)$$

It is instead worth noting that the first regenerative braking torque value VCFR1 and the second regenerative braking torque value VCFR2 to be provided to said at least one traction and regenerative braking supply module 203 are the function of the determined regenerative braking power dynamic distribution ratio RDPF, of the second information I2 (speed of at least one of the vehicle 100, the first moving member R1 of the vehicle 100 and the second moving member R2 of the vehicle 100) and of the third information I3 (state of the battery module 205 and said at least one traction and regenerative braking supply module 203):

$$VCFR1,VCFR2=f(RDPF,I2,I3)$$

It is instead worth noting that the first dissipative braking torque value VCFD1 to be applied to the first axle and the second dissipative braking torque value VCFD2 to be applied to the second axle are according to the regenerative braking power dynamic distribution ratio RDFP, to the first information I1 (deceleration request of the vehicle 100) and to the third information I3 (state of the battery module 205 and said at least one traction and regenerative braking supply module 203):

$$VCFD1,VCFD2=f(RDPF,I1,I3)$$

Moreover, the dissipative electric power value VPED is a function of the third information I3 (state of the battery module 205 and said at least one traction and regenerative braking supply module 203), of the first dissipative braking torque value VCFD1 and of the second dissipative braking torque value VCFD2:

$$VPED=f(I3,VCFD1,VCFD2)$$

It is worth noting that a calculation example of the regenerative braking power dynamic distribution ratio RDPF is described later in a related APPENDIX 2, with the aid of the FIG. 5.

As can be noted, the object of the present invention is completely achieved.

Firstly, the method and related system described allow the control/management of the regenerative braking torque according to the (measured or estimated) temperature relating to the components of the braking system.

Thereby, the method for controlling the regenerative braking torque may be implemented while considering the temperature thresholds with respect to the ones at which a proportional (linear) action is performed, i.e. the more the temperature of a component of the braking system increases, the more the effect of the regenerative braking torque is accentuated on the axle of the vehicle involved by the increase in temperature.

Thereby, the regenerative braking torque may be distributed, obtaining more uniform temperatures and avoiding an excessive increase thereof, which could compromise the efficiency of the braking.

An increased braking efficiency may be obtained with the method and the related system proposed in the present invention with respect to a control method with fixed distribution of the regenerative braking power between the axles of a vehicle, which certainly results in less tightening forces for example, between brake caliper and brake disc.

Moreover, the control of the regenerative braking torque with distribution according to the temperature of the components of the braking system allows the braking system performance to be maintained during mission cycles with intensive action of the braking system itself, in the case for example, of a vehicle employed in sports events subjected to repeated acceleration and braking.

Again, the control of the regenerative braking torque with distribution according to the temperature of the components of the braking system allows the efficiency to be maintained and an increased safety of the braking system to be ensured which is typical of a vehicle in which the driver or the autonomous drive system requests an intensive intervention of the braking system.

The method and related system of the present invention advantageously allow the temperatures of the components of the braking system on the various axles of the vehicle to be standardized as much as possible, for example first front axle and second rear axle, while keeping the efficiency of the braking system as constant as possible during the vehicle mission, avoiding fatigue conditions of the braking system in which the maximum performance might no longer be ensured, reducing the wear, increasing the operating life of the components of the braking system of the vehicle.

The method and related system for controlling the regenerative braking torque allows the quantity of energy flowing in the braking system to be managed and therefore a uniform temperature distribution in the components involved (brake discs, brake calipers, brake pads, brake fluid) to be ensured.

With respect to a regeneration method with fixed distribution which is usually dependent on the maximum power that can be regenerated by the traction system and by the charge state of the battery and of the other power storage systems, or is constant during the vehicle mission, the method and related system the object of the present invention allow—using the information listed above (deceleration request of the vehicle, first temperature value of a component of the braking system of the first axle, second temperature value of a component of the braking system on the second axle, state of the battery module and so on)—the temperatures of the components of the braking system to be controlled with a set and proportional distribution of the regenerative braking torque.

The method and system the object of the present invention do not provide the unbalancing of the braking with respect to an ideal distribution curve which would theoretically ensure a stable braking by avoiding blocking of the wheels and subsequent instability of the vehicle.

Indeed, the method and the system of the present invention instead provide a dynamic balancing of the regenerative braking power, therefore keeping unaltered the balancing with respect to the ideal distribution curve of the overall braking power (dissipative+regenerative) between the first front axle and the second rear axle.

In greater detail, the distribution of overall braking power between the first front axle and the second rear axle in the method and the system of the present invention is fixed while the distribution of regenerative braking power (according to temperature and the system states) between the first front axle and the second rear axle is variable, thus advantageously allowing as balanced as possible "optimal" braking to be obtained, preserving the stability of the vehicle.

In the method and system of the present invention, the use of information, such as measurement/estimation of temperature, wear and power that can be regenerated and subsequent use of the regeneration function in case thresholds are exceeded and in case of availability of the battery to receive energy, however is associated with obtaining a balanced braking in terms of braking force applied to the ground in order to benefit from reducing the fatigue of the braking system using the regeneration.

Thus, the braking strategy that may be obtained with the method and the system of the present invention advantageously allows the stability of the vehicle to be obtained because it only distributes the braking power in a balanced manner in terms of force to the ground (vehicle stability, use of ideal braking distribution function) using a dynamic distribution of the regenerative braking power between the first front axle and the second rear axle, only for the portion that relates to the regenerative braking power.

Thereby, it is reiterated how it is possible to benefit from a balanced braking to obtain stability by means of a theoretical distribution curve of the braking force to the ground and a control of the temperature and wear of the braking system by means of a dynamic distribution of the regenerative braking power.

The method and the system of the present invention provide using resistances for the dissipation of excess energy in order to benefit from a balanced braking to obtain stability by means of a theoretical distribution curve of the braking force and the control of the temperature and wear of the braking system by means of the dynamic distribution of the regenerative braking power if the information relating to the limitation of the battery in storing the braking energy (regenerative braking power) is detected by the at least one data processing unit.

Moreover, the method and the system of the present invention provide the use of temperature thresholds to determine a dynamic distribution ratio of the regenerative braking power between the first front axle and the second rear axle and a fixed distribution ratio of the braking power between axles (given by the optimal distribution curve of the forces) in order to obtain a balanced braking (therefore stability of the vehicle) by means of a theoretical distribution curve of the braking force and a control of the temperature and wear of the braking system by means of the dynamic distribution of the regenerative braking power.

Those skilled in the art may make several changes and adaptations to the above-described embodiments of the method and related system, and may replace elements with others which are functionally equivalent in order to meet contingent needs, without departing from the scope of the following claims. Each of the features described as belonging to a possible embodiment may be achieved irrespective of the other embodiments described.

APPENDIX 1

Example of Calculation of the Braking Power Fixed Distribution Ratio RPF $$W_{front} = \frac{c}{l} \cdot W + \frac{h}{l} \cdot W \cdot Dx, \quad (1)$$

in which:
$W_{front}$=ground load related to the first front axle (first front axle shaft+second front axle shaft) of the vehicle 100;
c=distance between center of the vehicle 100 and the second rear axle (first rear axle shaft+second rear axle shaft) of the vehicle 100;
l=wheelbase of the vehicle 100;
W=total weight of the vehicle 100;
h=center height of the vehicle 100;
Dx=deceleration of the vehicle 100.

$$W_{rear} = \frac{b}{l} \cdot W - \frac{h}{l} \cdot W \cdot Dx, \quad (2)$$

in which:
$W_{rear}$=ground load related to the second rear axle (first rear axle shaft+second rear axle shaft) of the vehicle 100;
b=distance between center of the vehicle 100 and the first front axle of the vehicle 100;
l=wheelbase of the vehicle 100;
W=total weight of the vehicle 100;
h=center height of the vehicle 100;
Dx=deceleration of the vehicle 100.

$$Fbrake_{front} = \mu_p \cdot W_{front} = \mu_p \cdot \left(\frac{c}{l} \cdot W + \frac{h}{l} \cdot W \cdot Dx\right), \quad (3)$$

in which:
$Fbrake_{front}$=braking power on the first front axle;
$\mu_p$=grip between tire of the wheel R1 and the road;
$W_{front}$=ground load related to the first front axle of the vehicle 100.

$$Fbrake_{rear} = \mu_p \cdot W_{rear} = \mu_p \cdot \left(\frac{b}{l} \cdot W - \frac{h}{l} \cdot W \cdot Dx\right). \quad (4)$$

in which:
$Fbrake_{rear}$=braking power on the second rear axle;
$\mu_p$=grip between tire of the wheel R2 and the road;
$W_{rear}$=ground load related to the second rear axle of vehicle 100.

$$Pbrake_{front} = Fbrake_{front} = r_{dynfront} \cdot \omega_{front}, \text{ in which:} \quad (5)$$

$Pbrake_{front}$=braking power of the first front axle;
$r_{dynfront}$=rolling radius of wheels on the first front axle;
$\omega_{front}$=angular speed of wheels of the first front axle of the vehicle 100.

$$Pbrake_{rear} = Fbrake_{rear} \cdot r_{dynrear} \cdot \omega_{rear}, \text{ in which:} \quad (6)$$

$Pbrake_{rear}$=braking power of the second rear axle;
$r_{dynrear}$=rolling radius of the wheels of the second rear axle;
$\omega_{rear}$=angular speed of the wheels of the second rear axle of the vehicle 100.

$$Pbrake_{vehicle} = Pbrake_{front} + Pbrake_{rear}, \text{ in which:} \quad (7)$$

$Pbrake_{vehicle}$=braking power of the vehicle 100;

$$\beta = \frac{Pbrake_{front}}{Pbrake_{rear}} = f(c, b, h, l, W, Dx), \quad (8)$$

in which:
β=fixed or static distribution ratio (RPF) of the braking power between the first front axle and the second rear axle;
f=function of physical law describing the dynamic of the vehicle which may be inferred from the previous steps indicated from points 1 to 6.

$$Pbrake_{rear} = \frac{Pbrake_{vehicle}}{\beta + 1} \quad (9)$$

$$Pbrake_{front} = \frac{Pbrake_{vehicle}}{1 + \frac{1}{\beta}} \quad (10)$$

Figure 4:
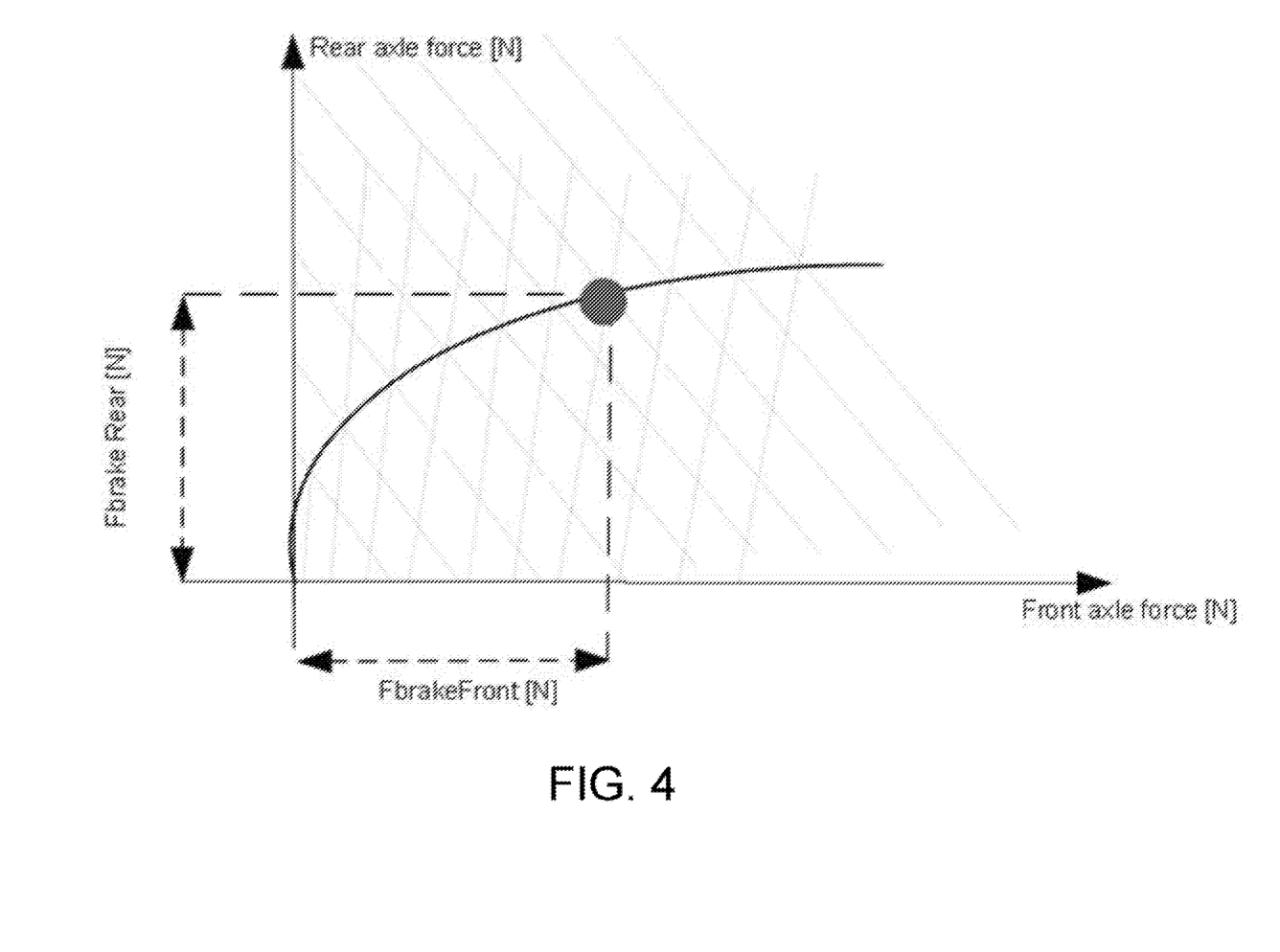
FIG. 4 graphically shows an optimal distribution of the braking force between two axles of a vehicle, and FIG. 5 graphically shows an example of distribution of the regenerative braking power between two axles of a vehicle, according to the method of the present invention.

FIG. 4 graphically shows an optimal distribution of the braking force between the first front axle (Fbrake$_{front}$) and the second rear axle (Fbrake$_{rear}$) of the vehicle 100 according to the example of calculation of APPENDIX 1.

APPENDIX 2

Example of Calculation of the Regenerative Braking Power Dynamic Distribution Ratio RDPF $$Pbrake_{front} = Pcaliper_{front} + Pregen_{front}, \text{ in which:} \quad (11)$$

Pbrake$_{front}$=braking power of the first front axle;
Pcaliper$_{front}$=braking power of the first front axle;
Pregen$_{front}$=regenerative braking power of the first front axle.

$$Pbrake_{rear} = Pcaliper_{rear} + Pregen_{rear}, \text{ in which:} \quad (12)$$

Pbrake$_{rear}$=braking power of the second rear axle;
Pcaliper$_{rear}$=braking power of the second rear axle;
Pregen$_{rear}$=regenerative braking power of the second rear axle.

$$Pregen_{available} = Pregen_{front} + Pregen_{rear}, \text{ in which:} \quad (13)$$

Pregen$_{available}$=available regenerative braking power;
Pregen$_{front}$=regenerative braking power of the first front axle;
Pregen$_{rear}$=regenerative braking power of the second rear axle.

$$\gamma = \frac{Pregen_{front}}{Pregen_{rear}}, \quad (14)$$

in which:
γ=dynamic regenerative braking power ratio.

$$\gamma = f(Tbrake_{front}, Tbrake_{rear}, SOC, Tbattery, Tpwt_{front}, Tpwt_{rear}), \text{ in which:} \quad (15)$$

Tbrake$_{front}$=temperature of the braking system of the first front axle;
Tbrake$_{rear}$=temperature of the braking system of the second rear axle;
SOC=charge state of the battery module 205;
Tbattery=temperature of the battery module 205;
Tpwt$_{front}$=temperature of traction/electric brake system of the first front axle;
Tpwt$_{rear}$=temperature of traction/electric brake system of the second rear axle.
Using equations (11) and (12) with the equation (14), the following is obtained:

$$Pregen_{front} = \frac{Pregen_{available}}{1 + \frac{1}{\gamma}} \quad (16)$$

$$Pregen_{rear} = \left(\frac{Pregen_{available}}{\gamma + 1}\right) \quad (17)$$

Using equations (11), (12), (16), (17) (laws determining the (variable) dynamic regenerative braking power ratio) with equations (9) and (10) of APPENDIX 1 (laws determining a braking power fixed distribution ratio RPF of braking power between axles), the following is obtained:

$$Pcaliper_{front} = \frac{Pbrake_{vehicle}}{1 + \frac{1}{\beta}} - \frac{Pregen_{available}}{1 + \frac{1}{\gamma}} \quad (18)$$

$$Pcaliper_{rear} = \frac{Pbrake_{vehicle}}{1 + \beta} - \frac{Pregen_{available}}{\gamma + 1} \quad (19)$$

Figure 5:
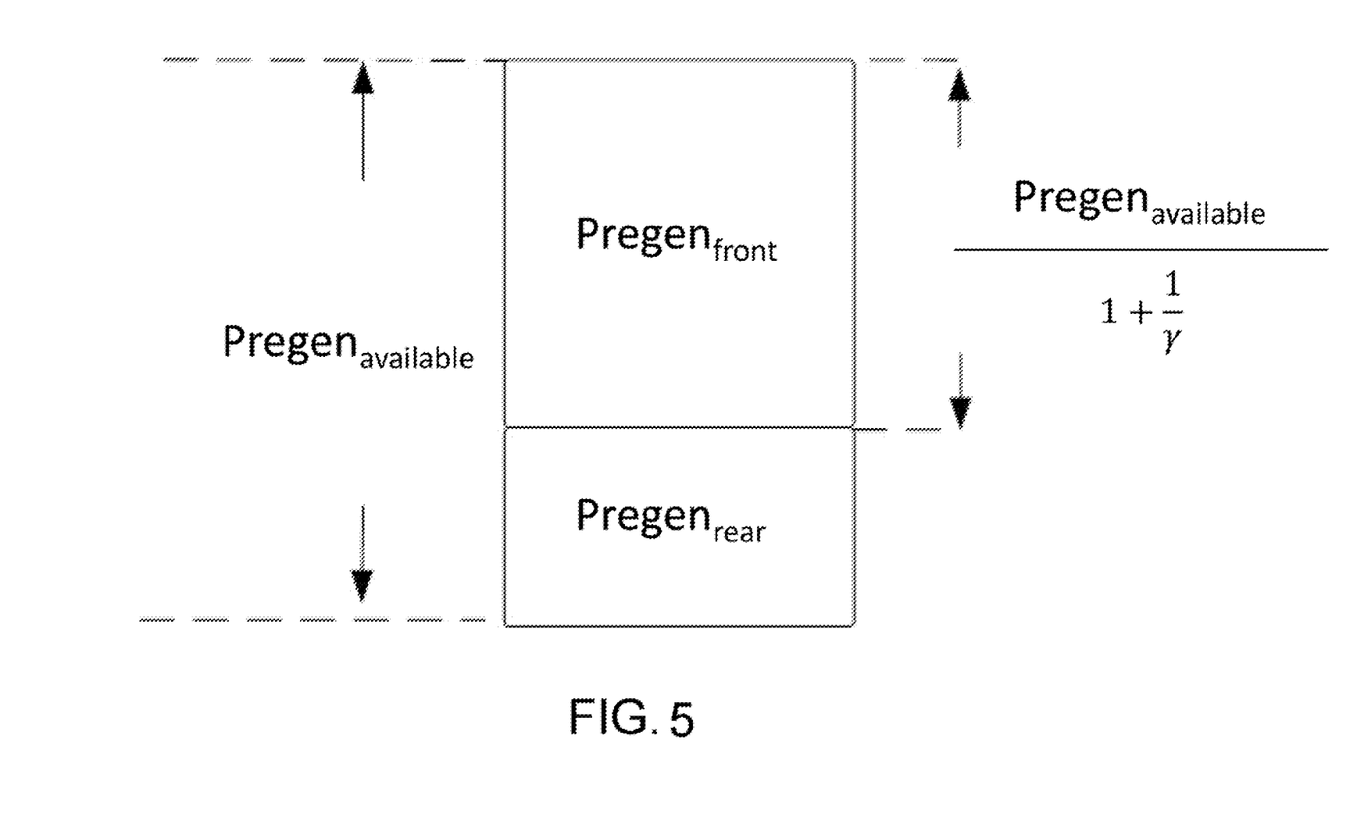

FIG. 5 graphically shows an example of distribution of the available regenerative braking power (Pregen$_{available}$) between the first front axle (Pregen$_{front}$) and the second rear axle (Pregen$_{rear}$) of the vehicle 100, according to the method of the present invention (example of calculation of APPENDIX 2).

The invention claimed is:

1. A method for controlling regenerative braking torque values of a vehicle, the vehicle comprising at least one first axle on which at least one first moving member of the vehicle is mounted and at least one second axle on which at least one second moving member of the vehicle is mounted, the vehicle further comprising a braking system comprising a first plurality of components operatively associated with said at least one first axle and a second plurality of components operatively associated with said at least one second axle, the vehicle comprising at least one traction and regenerative braking supply module configured to provide information on the basis from which regenerative braking torque values can be determined and provided to one or more regenerative braking torque actuation modules, the regenerative braking torque actuation modules comprising at least one electric motor, the vehicle further comprising a battery module and at least one data processing unit operatively connected to said at least one traction and regenerative braking supply module, to the first plurality of components of the braking system, and to the second plurality of components of the braking system,
the method comprising steps of:
detecting, by the at least one data processing unit, a first information representing a deceleration request of the vehicle;
detecting, by the at least one data processing unit, a second information representing a speed of at least one of the vehicle, the first moving member of the vehicle and the second moving member of the vehicle;
determining, by the at least one data processing unit, a first temperature value of at least one component of the first plurality of components of the braking system operatively associated with said at least one first axle;
determining, by the at least one data processing unit, a second temperature value of at least one component of the second plurality of components of the braking system operatively associated with said at least one second axle;
determining, by the at least one data processing unit, a third information representing an electric charge of the battery module;
determining, by the at least one data processing unit, a regenerative braking power dynamic distribution ratio between the at least one first axle and the at least one second axle on the basis of the first information, of the first temperature value and of the second temperature value;

determining, by the at least one data processing unit, a first regenerative braking torque value to be applied to the at least one first axle and a second regenerative braking torque value to be applied to the at least one second axle on the basis of the determined regenerative braking power dynamic distribution ratio, of the second information and of the third information;

providing, by the at least one data processing unit, the first regenerative braking torque value and the second regenerative braking torque value to said at least one traction and regenerative braking supply module;

wherein the first plurality of components of the braking system associated with said at least one first axle comprises at least one first dissipative braking torque actuation device, the second plurality of components of the braking system associated with said at least one second axle comprising at least one second dissipative braking torque actuation device, the method further comprising steps of:

determining, by the at least one data processing unit, a first dissipative braking torque value to be applied to the at least one first axle and a second dissipative braking torque value to be applied to the at least one second axle on the basis of the determined braking power dynamic distribution ratio, of the first information and of the third information;

providing, by the at least one data processing unit, the first dissipative braking torque value to said at least one first dissipative braking torque actuation device and the second dissipative braking torque value to said at least one second dissipative braking torque actuation device, wherein the vehicle further comprises a dissipation resistance module, the method comprising steps of:

determining, by the at least one data processing unit, a dissipative electric power value on the basis of the third information, of the first dissipative braking torque value and of the second dissipative braking torque value;

providing, by the at least one data processing unit, the dissipative electric power value to the dissipation resistance module; and the dissipation resistance module is configured to dissipate a quantity of regenerative power.

2. The method according to claim 1, wherein the step of determining the regenerative braking power dynamic distribution ratio between the at least one first axle and the at least one second axle comprises steps of:

determining, by the at least one data processing unit, a braking power fixed distribution ratio between the at least one first axle and the at least one second axle on the basis of the first information representing the deceleration request of the vehicle and of data representing properties of the vehicle;

determining, by the at least one data processing unit, a regenerative braking power variation of the at least one first axle on the basis of the first temperature value and a set first temperature threshold value;

determining, by the at least one data processing unit, a regenerative braking power variation of the at least one second axle on the basis of the second temperature value and a set second temperature threshold value, the regenerative braking power dynamic distribution ratio between the at least one first axle and the at least one second axle being determined, by the at least one data processing unit, as a function of the fixed distribution ratio, of the regenerative braking power variation of the at least one first axle and of the regenerative braking power variation of the at least one second axle.

3. The method according to claim 1, wherein the step of determining the first temperature value is performed by using a plurality of sensors distributed on the first plurality of components of the braking system, operatively connected to the at least one data processing unit.

4. The method according to claim 1, wherein the step of determining the first temperature value comprises a step of estimating, by the at least one data processing unit, the first temperature value, the step of estimating being obtained on the basis of the measurement of the force exerted by a component of the first plurality of components of the braking system and on the basis of the second information representing the speed of at least one of the vehicle, the first moving member of the vehicle, and the second moving member of the vehicle.

5. The method according to claim 1, wherein the step of determining the second temperature value is performed by using a plurality of sensors distributed on the second plurality of components of the braking system, operatively connected to the at least one data processing unit.

6. The method according to claim 1, wherein the step of determining the second temperature value comprises a step of estimating, by the at least one data processing unit, the second temperature value, the step of estimating the second temperature value being obtained on the basis of the measurement of the force exerted by a component of the second plurality of components of the braking system and on the basis of the second information representing the speed of at least one of the vehicle, the first moving member of the vehicle, and the second moving member of the vehicle.

7. A system for controlling regenerative braking torque values of a vehicle, comprising:

at least one first axle on which at least one first moving member of the vehicle is mounted and at least one second axle on which at least one second moving member of the vehicle is mounted;

a braking system comprising a first plurality of components operatively associated with said at least one first axle and a second plurality of components operatively associated with said at least one second axle;

at least one traction and regenerative braking supply module configured to provide information on the basis from which regenerative braking torque values can be determined and provided to one or more regenerative braking torque actuation modules, the regenerative braking torque actuation modules comprising at least one electric motor;

a battery module;

at least one data processing unit operatively connected to said at least one traction and regenerative braking supply module, to the first plurality of components of the braking system, and to the second plurality of components of the braking system, the at least one data processing unit being configured to perform the steps of:

detecting a first information representing a deceleration request of the vehicle;

detecting a second information representing a speed of at least one of the vehicle, the first moving member of the vehicle and the second moving member of the vehicle;

determining a first temperature value of at least one component of the first plurality of components of the braking system operatively associated with said at least one first axle;

determining a second temperature value of at least one component of the second plurality of components of the braking system operatively associated with said at least one second axle;

determining a third information representing an electric charge of the battery module;

determining a regenerative braking power dynamic distribution ratio between the at least one first axle and the at least one second axle on the basis of the first information, of the first temperature value and of the second temperature value;

determining a first regenerative braking torque value to be applied to the at least one first axle and a second regenerative braking torque value to be applied to the at least one second axle on the basis of the determined regenerative braking power dynamic distribution ratio, of the second information and of the third information;

providing the first regenerative braking torque value and the second regenerative braking torque value to said at least one traction and regenerative braking supply module;

wherein the first plurality of components of the braking system associated with said at least one first axle comprises at least one first dissipative braking torque actuation device, the second plurality of components of the braking system associated with said at least one second axle comprising at least one second dissipative braking torque actuation device, the at least one data processing unit being configured to perform steps of:

determining a first dissipative braking torque value to be applied to the at least one first axle and a second dissipative braking torque value to be applied to the at least one second axle on the basis of the determined braking power dynamic distribution ratio, of the first information and of the third information;

providing the first dissipative braking torque value to said at least one first dissipative braking torque actuation device and the second dissipative braking torque value to said at least one second dissipative braking torque actuation device, wherein the vehicle further comprises a dissipation resistance module, the at least one data processing unit being configured to perform steps of:

determining a dissipative electric power value on the basis of the third information, of the first dissipative braking torque value and of the second dissipative braking torque value;

providing the dissipative electric power value to the dissipation resistance module; and the dissipation resistance module is configured to dissipate a quantity of regenerative power.

8. The system according to claim 7, wherein the first plurality of components of the braking system associated with said at least one first axle comprises at least one first dissipative braking torque actuation device, and the second plurality of components of the braking system associated with said at least one second axle comprising at least one second dissipative braking torque actuation device.

9. The system according to claim 7, wherein the first plurality of components of the braking system comprises a first regenerative braking torque actuation module operatively connected to the at least one first axle on which the at least one first moving member is mounted, the second plurality of components of the braking system comprising at least one second regenerative braking torque actuation module operatively connected to the at least one second axle on which the at least one second moving member is mounted.

* * * * *